United States Patent
Hampel

[11] 3,813,152
[45] May 28, 1974

[54] EYEGLASS FRAME

[76] Inventor: Gerald Hampel, Aussichtsweg 9, A Vienna 19, Austria

[22] Filed: Jan. 22, 1973

[21] Appl. No.: 326,659

[30] Foreign Application Priority Data
Jan. 21, 1972   Austria ............................. 960/72

[52] U.S. Cl................ 351/153, 16/128 A, 351/113, 351/114
[51] Int. Cl......... G02c 5/22, G02c 5/16, E05d 1/00
[58] Field of Search .......... 351/113, 114, 121, 153; 16/128 A; 2/14 T, 14 UT

[56] References Cited
UNITED STATES PATENTS
2,608,905   9/1952   Nelson ............................. 351/114
3,531,190   9/1970   Leblanc ............................ 351/113

Primary Examiner—Ronald L. Wibert
Assistant Examiner—Paul A. Sacher
Attorney, Agent, or Firm—Michael S. Striker

[57] ABSTRACT

A main frame portion for the lenses has spaced first end sections, and a pair of earpieces each have a second end section. A pair of hinges each connect one of the earpieces to the main frame portion so that the earpiece can be displaced between a folded and an open position. Each of the hinges includes a first hinge component of piano wire having one end embedded in one of the end sections of the main frame portion and another end extending outwardly beyond the latter, and a second hinge component is hingedly connected with the other end and is mounted on an end section of the associated earpiece. The hinges connect the earpieces with the main frame portion in such a manner that the end sections of the earpieces do not contact the main frame portion when the earpieces are in open position except if the earpieces are displaced past the open position, in which case contact can occur only after the outwardly extending end portion of the first hinge component has undergone elastic deformation.

8 Claims, 4 Drawing Figures

PATENTED MAY 28 1974 3,813,152

EYEGLASS FRAME

BACKGROUND OF THE INVENTION

The present invention relates generally to an eyeglass frame, and more particularly to an eyeglass frame having a novel hinge arrangement.

One of the big problems encountered by many wearers of eyeglasses is the fact that the ear or temple pieces do not usually engage the temples with uniform pressure sufficient to prevent the glasses from slipping under all circumstances. This, however, is one of the main reasons why glasses fall off and become damaged, and at the very least it is a source of frequent and constant annoyance.

The problem with the prior-art constructions is that the hinges which mount the earpieces to the main frame portion having the lenses, are of rigid construction. The angle which can be included between each earpiece and the main frame portion when the earpiece is in open position is dictated by the degree to which the earpiece can be opened before it will abut against the main frame portion and be prevented from further displacement. The material of the main frame portion, and certainly of the earpieces must have a certain elasticity as is well known to those skilled in the art. This means that over a period of time it tends to change shape and lose whatever tension it has as it engages the temples of the wearer, and therefore the contact with the temples under constant pressure is not assured in the conventional eyeglass frame constructions. In fact, the manner in which the ends of the earpieces abut the main frame portion when they are in open position and are urged outwardly by the temples of the wearer has been found to be disadvantageous because it tends to cause a deformation of the main frame portion in the long run, which in turn of course leads over a period of time to improper seating of the frame.

The problem is not new per se and attempts have been made to overcome it. It is known from the prior art to provide spring elements which are embedded in the earpieces and which act upon the rigid hinges. However, it has been found that these spring elements over a period of time tend to lose some or all of their spring characteristics and become ineffective. In addition, the inclusion of such spring elements necessarily requires an increase in the size of the components with which they are associated, such as the earpieces, so that the eyeglass frame must be relatively large and bulky —and therefore aesthetically displeasing to many wearers— to permit their use. In addition, the installation of such spring elements sometimes was accompanied with some difficulties and this meant increased expenditures in terms of assembly and therefore of retail cost.

Furthermore, these known prior-art constructions make for a relatively heavy frame which is also as a rule not desired by the wearer. Finally, the known prior-art constructions, that is the hinge arrangements thereof, have a relatively high inherent friction which increases with use due to the deposition of contaminants or the like, and which further decreases the desired spring effect with which the earpieces are to be urged into constant and uniform engagement with the temple of the wearer.

SUMMARY OF THE INVENTION

It is, accordingly, a general object of the present invention to overcome the disadvantages outlined above with respect to the prior art.

More particularly it is an object of the invention to provide an improved eyeglass frame which is not possessed of these disadvantages.

A still more particular object of the invention is to provide such an improved eyeglass frame in which the earpieces are reliably connected with the main frame portion so that they will always engage the temples of a wearer under constant and uniform pressure, thereby assuring a proper seating of the glasses.

In keeping with these objects, and with others which will become apparent hereafter, one feature of the invention resides in an eyeglass frame which, briefly stated, comprises a main frame portion adapted to mount a pair of lenses and having spaced first end sections, and a pair of earpieces each having a second end section. A pair of hinges is provided, each of the hinges connecting one of the earpieces to the main frame portion for displacement between a folded and an open position. Each of the hinges includes a springy first hinge component having one end embedded in one of the end sections and an exposed free end, and a second hinge component hingedly connected with the respective free end and mounted on the other of the end sections. The hinges each connect the respectively associated earpieces to the main frame portion in such a manner that their respective end sections are normally out of contact when the earpiece is in open position but that the respective end sections are able to move into such contact in response to displacement of the earpiece beyond the open position; such contact can, however, take place only after elastic deformation of the first hinge component has first taken place.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
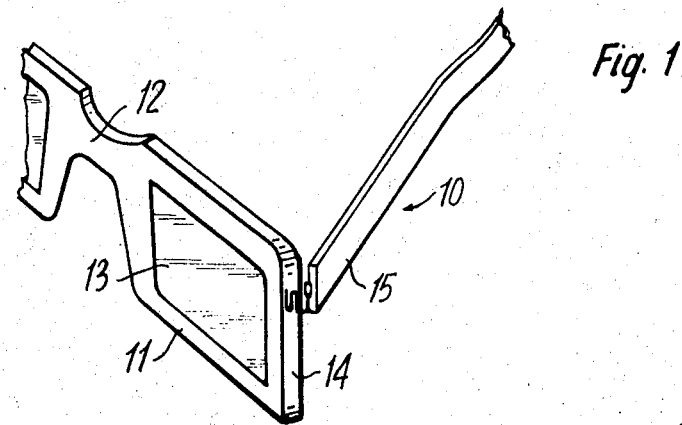
FIG. 1 is a partial perspective view illustrating a pair of eyeglasses.
Figure 2:
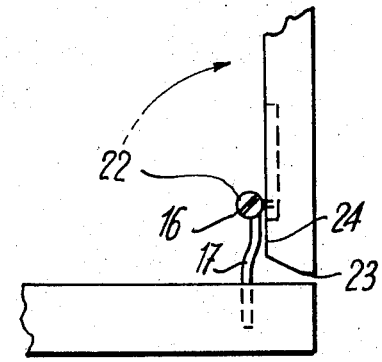
FIG. 2 is a fragmentary top-plan view, on an enlarged scale, of a detail of FIG. 1.
Figure 3:
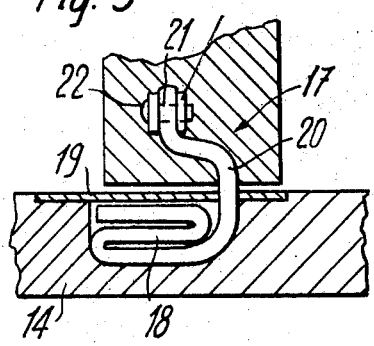
FIG. 3 is a fragmentary sectional detail view, on an enlarged scale, of the embodiment in FIG. 2.

Discussing the drawing in detail, and firstly the embodiment of FIGS. 1–3, it will be seen that FIG. 1 shows a pair of eyeglasses which is designated in toto with reference numeral 10. The eyeglasses have an eyeglass frame, a main portion of which is identified with reference numeral 11 and provided with a nose piece or bridge 12; two lenses 13 are mounted in the main frame portion 11. At opposite spaced first end sections 14 of the main frame portion 11 (only one of the end sections is shown) there are mounted two conventional earpieces or temple pieces 15 (only one shown in part) which can be moved hingedly between a position in which they are folded against the rear side of the main portion 11, and a position at which they extend substantially at right angles to the main frame portion 11. The earpiece 15 in FIG. 1 is shown close to but not entirely in the open position.

The earpieces 15 are mounted on the main frame portion 11 by means of a pair of hinges which are in accordance with the present invention. FIG. 2 shows that the hinges each have one hinge component 16 which is mounted in the illustrated embodiment on the earpiece 15, and an other hinge component 17 which in the illustrated embodiment is mounted on the main frame portion 11.

In the embodiment of FIGS. 1-3 the hinge component 17 is of springy material, for instance spring steel such as piano wire. It has one end portion 18 which is embedded in the material of the main frame portion, at the end section 14 thereof. This can be done by casting the material of the main frame portion about the end portion 18, by adhesively bonding the end portion 18 in a recess of the main frame portion, or in other suitable manner. FIG. 3 shows that the end portion 18 is provided with at least one (several shown) convolutions in order to assure a proper retention in the material of the main frame portion 11. The convoluted end portion 18 is covered by a cover plate 19 which is mounted on the main frame portion 11 and conceals the convoluted end portion 18.

The hinge component 17 has a free end portion 20 which projects out of the main frame portion 11 and is bent to what in FIGS. 1-3 is approximately S-shaped configuration. It is provided with an eye 21 which is connected with the hinge component 16 on the earpiece 15 in usual manner, with the two being joined by means of a screw or analogous connecting element.

FIG. 3 shows particularly clearly (compare also FIG. 2) that the mounting and connection of the hinge component 16 and 17 relative to one another is such that when the earpiece 15 is in the open position its end section which is adjacent the main frame portion does not contact the same in normal use. This is clearly shown in FIG. 2 in which it will be seen that in this position there will be a space 23 between the earpiece and the main frame portion. The abutment which normally prevents displacement of the earpiece beyond the fully open position is constituted by the fact that the inner side 24 of the earpiece 15 moves into contact with the end portion 20 of the hinge component 17. This is also illustrated in FIG. 2.

However, when the glasses are placed onto the head of a wearer the earpieces 15 are displaced beyond this "normal" open position, that is beyond the position which they assume when the earpieces are moved to open position but the glasses are not placed upon the head of the wearer. When this takes place the earpieces are displaced beyond the "normal" open position, and this can occur only by elastically deforming the end portion 20 of the hinge component 17. Of course, the elasticity of the hinge component 17 is practically unchanging over the lifetime of the eyeglasses which assures that the earpieces will always be urged with uniform contact into engagement with the temples of a wearer. This assures not only a constant force of engagement, but also prevents any displacement of the glasses and thereby eliminates a substantial source of annoyance for the ordinary wearer of eyeglasses.

Moreover, the construction according to the present invention assures that in the event an earpiece is opened too rapidly and/or too carelessly, the danger of breakage is reduced substantially over what is known from the prior art. It will first engage the portions 20 and a very definite resistance will become apparent, and only thereafter will it move past this point under simultaneous elastic deformation of the portions 20 into engagement with the main frame portion 11. This of course means that there is substantially less force transmitted to the main frame portion (prior to contact of the end section of the earpiece 15 with the main frame portion) than is the case with a rigid hinge construction, and as a result there is much less danger of breakage.

Figure 4:
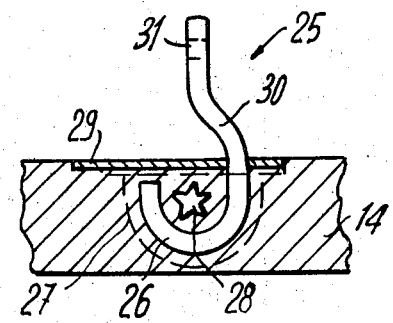
FIG. 4 is a view similar to FIG. 3 but illustrating a further embodiment of the invention.

Coming to the embodiment in FIG. 4 it will be seen that here reference numerals 11 and 14 designate the same components as in FIGS. 1-3. Reference numeral 25 designates one of the hinge components which corresponds to the hinge component 17 in the embodiment of FIGS. 1-3. It is a spring steel and formed with a substantially hook-shaped portion 26 which is embedded in the material of the portion 14 of the main frame portion 11. This arrangement assures a reliable retention in the frame portion 11.

FIG. 4 shows in broken lines a cover in form of half of a hollow disc or the like which may be of bright metallic material and may be provided with a decoration, a trademark, the name of the manufacturer or the like, symbolically identified with reference numeral 28 in FIG. 4. The arrangement would be such that the trademark or whatever is identified by reference numeral 28 would be visible when the wearer uses the glasses. However, the cover 28 can also be omitted.

The plate 29 is a cover plate corresponding to the plate 19 of FIG. 3. The end portion 30 of the hinge component 25 extends outwardly of the material of the main frame portion 11 and is provided with an eye 31 which is to be connected with the hinge component 16 (compare FIG. 2).

It should be understood that the hinge component 17 of FIG. 3 or 25 of FIG. 4 need not be of metallic material or spring steel, but could for instance be of a suitable synthetic plastic material, for instance a glass-fiber reinforced injection-molded or otherwise produced element.

It will be appreciated that the hinge construction according to the present invention is particularly suitable for use in eyeglass frames of synthetic plastic material, although it can be used in any kind of eyeglass frame whatever material the same may be made of. The connection of the hinges with the main frame portion and the earpieces is very simple and presents no problems, so that the installation is inexpensive and rapid. This means that the cost of manufacturing and of selling eyeglass frames provided with these hinges can be decreased significantly, a desirable aspect, without having to accept a reduction in quality.

It will be understood that each of the elements described above, or two or more together, may also find a useful application in other types of constructions differing from the types described above.

While the invention has been illustrated and described as embodied in an eyeglass frame, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims:

1. An eyeglass frame, comprising a main frame portion adapted to mount a pair of lenses and having spaced first end sections; a pair of earpieces each having a second end section; a pair of hinges each connecting one of said earpieces to said main frame portion for displacement between a folded and an open position, said hinges each including a springy first hinge component having one end provided with at least one convolution embedded in one of said end sections and an exposed free end, and a second hinge component hingedly connected with said free end and mounted on the other of said end sections, said hinges each connecting the respectively associated earpiece to said main frame portion so that their respective end sections are normally out of contact when the earpiece is in open position and are able to move into such contact in response to displacement of the earpiece beyond said open position only upon elastic deformation of said first hinge component and a pair of cover plates mounted in said one end section each overlying the respective one of said convolutions and concealing the same.

2. An eyeglass frame as defined in claim 1, wherein said one end is embedded in said first end section of said main frame portion.

3. An eyeglass frame as defined in claim 2, wherein each of said earpieces has one side which faces said main frame portion when the earpiece is in folded position; and wherein said one side abuts against said free end of the associated first hinge components when said earpiece is in open position.

4. An eyeglass frame as defined in claim 1, wherein said main frame portion is molded about said one end.

5. An eyeglass frame as defined in claim 1, said free end being shaped as an eye; and further comprising connecting means extending through said eye and connecting the same to the associated second hinge component.

6. An eyeglass frame as defined in claim 1, wherein said free end is of substantially S-shaped configuration.

7. An eyeglass frame as defined in claim 1, wherein at least said first hinge component is of spring steel.

8. An eyeglass frame as defined in claim 1, wherein at least said first hinge component is of piano wire.

* * * * *